(12) United States Patent
Dierickx et al.

(10) Patent No.: US 7,973,845 B2
(45) Date of Patent: Jul. 5, 2011

(54) METHOD AND PIXEL FOR PERFORMING CORRELATED DOUBLE SAMPLING

(75) Inventors: Bart Dierickx, Edegem (BE); Jan Bogaerts, Sint-Katelijne-Waver (BE)

(73) Assignee: ON Semiconductor Trading, Ltd., Hamilton (BM)

( * ) Notice: Subject to any disclaimer, the term of this patent is extended or adjusted under 35 U.S.C. 154(b) by 858 days.

(21) Appl. No.: 11/136,545

(22) Filed: May 25, 2005

(65) Prior Publication Data

US 2005/0270394 A1  Dec. 8, 2005

(30) Foreign Application Priority Data

May 25, 2004 (GB) .................................. 0411648.9

(51) Int. Cl.
H04N 5/335 (2006.01)
H03M 1/34 (2006.01)

(52) U.S. Cl. ........................ 348/308; 341/162

(58) Field of Classification Search .................. 348/308, 348/241; 341/162
See application file for complete search history.

(56) References Cited

U.S. PATENT DOCUMENTS

| | | | | |
|---|---|---|---|---|
| 4,547,676 A * | 10/1985 | Suzuki et al. | ............. | 250/208.3 |
| 5,128,534 A | 7/1992 | Wyles et al. | | |
| 5,461,425 A | 10/1995 | Fowler et al. | | |
| 5,754,056 A | 5/1998 | Sauer | | |
| 5,990,948 A | 11/1999 | Sugiki | | |
| 6,166,367 A | 12/2000 | Cho | | |
| 6,166,766 A * | 12/2000 | Moore et al. | ................. | 348/241 |
| 6,388,241 B1 * | 5/2002 | Ang | ............................ | 250/208.1 |
| 6,421,085 B1 * | 7/2002 | Xu | ................................. | 348/308 |
| 6,477,592 B1 * | 11/2002 | Chen et al. | ...................... | 710/52 |
| 6,690,418 B1 * | 2/2004 | Terasawa et al. | ............. | 348/235 |
| 6,819,280 B2 * | 11/2004 | Huang et al. | ................... | 341/162 |
| 6,836,291 B1 | 12/2004 | Nakamura et al. | | |
| 2003/0011694 A1 * | 1/2003 | Dierickx | ....................... | 348/308 |

FOREIGN PATENT DOCUMENTS

| EP | 0788277 A2 | 8/1997 |
|---|---|---|
| EP | 1003220 A2 * | 5/2000 |

OTHER PUBLICATIONS

Search Report dated Aug. 10, 2005, for United Kingdom patent application No. GB0510547.3, filed May 24, 2005, 1 page.
Examination Report dated Apr. 1, 2008, for United Kingdom patent application No. GB0510547.3, filed May 24, 2005, 2 pages.
Yadid-Picht, "A random access photodiode array for intelligent image capture", IEEE Transactions of Electron Devices, vol. 38, No. 8, Aug. 1991, p. 1772; 9 pages.
USPTO Notice of Allowance for U.S. Appl. No. 09/906,418 dated Feb. 1, 2007; 6 pages.
USPTO Non-Final Rejection for U.S. Appl. No. 09/906,418 dated Oct. 6, 2005; 9 pages.
USPTO Final Rejection for U.S. Appl. No. 09/906,418 dated Jun. 15, 2005; 11 pages.
USPTO Non-Final Rejection for U.S. Appl. No. 09/906,418 dated Feb. 28, 2005; 12 pages.
USPTO Miscellaneous Action for U.S. Appl. No. 09/906,418 dated Mar. 2, 2007; 3 pages.

* cited by examiner

*Primary Examiner* — Nicholas G Giles
*Assistant Examiner* — Joel Fosselman

(57) ABSTRACT

A method and apparatus for performing correlated double sampling to remove low frequency noise. The method and apparatus includes an active pixel of an array of active pixels comprising a sensor circuit for collecting radiation induced charges and transducing them to a measurement signal corresponding to the amount of charge collected, two memory elements for storing the measurement signal at the beginning and the end of a first integration period respectively, and at least one further memory element for storing at least the measurement signal at the beginning of a next integration period.

20 Claims, 2 Drawing Sheets

METHOD AND PIXEL FOR PERFORMING CORRELATED DOUBLE SAMPLING

TECHNICAL FIELD OF THE INVENTION

The present invention relates to a pixel structure and an image sensor provided with means for performing correlated double sampling and a method for performing correlated double sampling.

BACKGROUND OF THE INVENTION

Correlated double sampling is a technique of taking two samples of a signal closely spaced in time and subtracting the first signal from the second to remove low-frequency noise. Sampling of the pixel output occurs twice: once after reset and once after integrating the signal charge. The subtraction removes the reset noise (kTC noise) and dc offset from the signal charge.

For correlated double sampling in a sensor array, a pixel of the sensor array needs to be able to yield, just after each other, the reset voltage on a capacitance, and the signal voltage on the same capacitance after it has integrated charge. Consecutive electronic circuitry (which is straightforward for persons skilled in the art) subtracts these two voltages and yields a more offset-free and noise-free result. For this reason, prior art pixel structures are provided with at least one memory element for memorising the reset level on the photodiode. At the moment of readout of the pixels, this reset voltage can be read, and the actual signal voltage, possibly also memorised in a second memory element, can be read immediately after it.

In current sensor devices the time difference between taking the two samples per pixel period is of the order of 100 ns or smaller. The time needed to completely reset the pixel is technology dependent. The time needed to calculate the correlated double sampling is also technology dependent. In conventional pixels, the reset time of the pixel is extended and made at least as long as the time needed to calculate the correlated double sampling. This slows down the pixel operation.

SUMMARY OF THE INVENTION

It is an object of the present invention to provide a pixel and an array of pixels providing correlated double sampling at a higher pixel operation rate as well as a method of correlated double sampling at a higher pixel operation rate.

The above objective is accomplished by a method and device according to the present invention.

In a first aspect, the present invention provides an active pixel comprising:
  a sensor circuit for collecting radiation induced charges and for transducing them to a measurement signal corresponding to the amount of charge collected,
  two memory elements for storing the measurement signal at the beginning and the end of a first integration period respectively, and
  at least one further memory element for storing at least the measurement signal at the beginning of a next integration period.

The memory elements may be capacitors. The memory elements may be parts of sample and hold stages.

According to an embodiment of the present invention, the memory elements may have a first node, and the active pixel may furthermore comprise a pre-charge circuit to pre-charge the voltage on the first node of the memory elements.

According to another embodiment of the present invention, the active pixel may furthermore comprise a read-out circuit connected to the memory elements, for reading out the measurement signal present on the node of a memory element. A first buffer may be provided between the memory elements and the read-out circuit.

A second buffer may be provided between the sensor circuit and the memory elements.

The sensor circuit may comprise a series connection of a reverse-biased photodiode and a reset switch.

In a second aspect, the present invention provides a method for performing correlated double sampling in an active pixel. The method according to the present invention comprises:
  during at least a first and a second subsequent integration period, collecting radiation induced charges and transducing them to a measurement signal,
  storing, in a first memory element, a reset level of the pixel at a beginning of the first integration period,
  storing, in a second memory element, a measurement signal of the pixel at an end of the first integration period, and
  while performing the correlated double sampling with the stored reset level and the stored measurement signal, storing, in a third memory element, a reset level of the pixel at the beginning of the second integration period.

A method according to the present invention may furthermore comprise a step of pre-charging a memory element before storing a signal.

In a method according to the present invention, when the active pixel comprises a photodiode, the method may furthermore comprise a step of resetting the photodiode to a pre-set voltage level before the beginning of an integration period.

In a third aspect, the present invention provides an array of active pixels. Each active pixel of the array comprises:
  a sensor circuit for collecting radiation induced charges and for transducing them to a measurement signal corresponding to the amount of charge collected,
  two memory elements for storing the measurement signal at a beginning and an end of an integration period respectively, and
  at least one further memory element for storing at least the measurement signal at a beginning of a next integration period.

The memory elements may be capacitors. The memory elements may be parts of sample and hold stages.

According to an embodiment of the present invention, the memory elements may have a first node, and each active pixel may furthermore comprise a pre-charge circuit to pre-charge the voltage on the first node of the memory elements.

According to another embodiment, an array according to the present invention may further comprise a read-out circuit connected to the memory elements, for reading out the signals stored on the memory elements. In each pixel a first buffer may be provided between the memory elements and the read-out circuit.

Furthermore, in each pixel a second buffer may be provided between the sensor circuit and the memory elements.

The sensor circuit of each pixel may comprise a series connection of a reverse-biased photodiode and a reset switch.

According to yet another embodiment, an array of active pixels according to the present invention may further comprise a circuit for controlling the timing of pre-charging of all the active pixels of the array at the same time.

These and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

Figure 1:
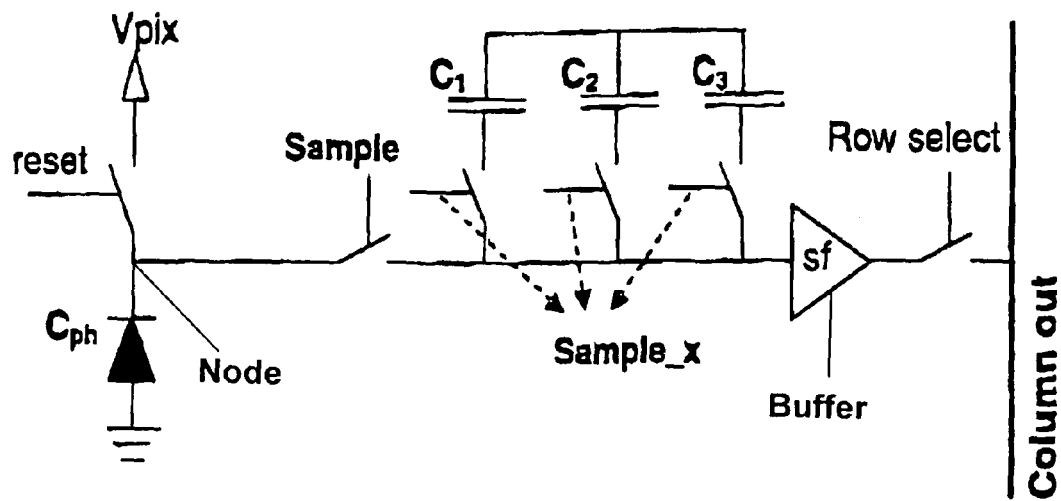
FIG. 1 is a schematic diagram of a pixel according to a first, simple embodiment of the present invention.

In the different figures, the same reference signs refer to the same or analogous elements.

DESCRIPTION OF THE ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. Thus, the scope of the expression "a device comprising means A and B" should not be limited to devices consisting only of components A and B. It means that with respect to the present invention, the only relevant components of the device are A and B.

Similarly, it is to be noticed that the term "coupled" should not be interpreted as being restricted to direct connections only. Thus, the scope of the expression "a device A coupled to a device B" should not be limited to devices or systems wherein an output of device A is directly connected to an input of device B. It means that there exists a path between an output of A and an input of B which may be a path including other devices or means.

The invention will now be described by a detailed description of an embodiment of the invention. It is clear that other embodiments of the invention can be configured according to the knowledge of persons skilled in the art without departing from the true spirit or technical teaching of the invention, the invention being limited only by the terms of the appended claims.

Figure 2:
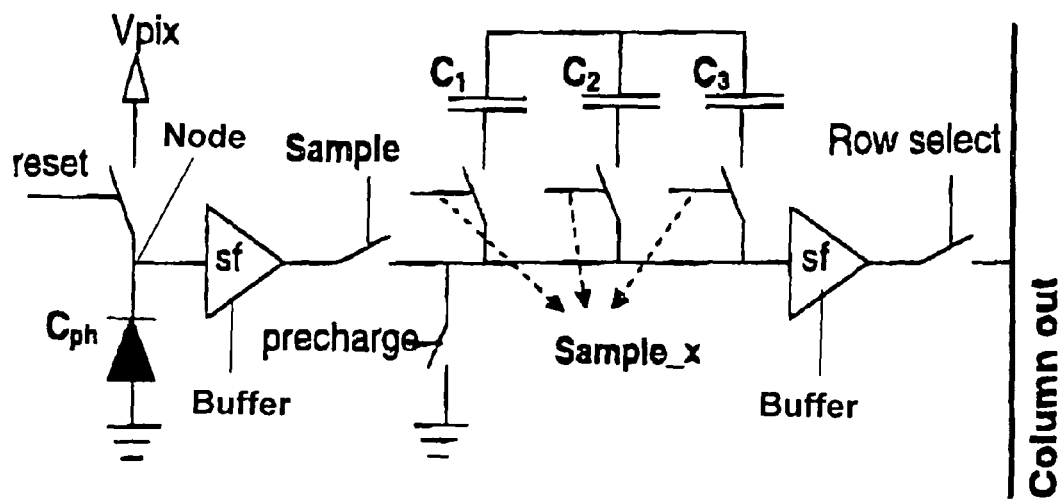
FIG. 2 is a schematic diagram of a pixel according to a second, more elaborate embodiment of the present invention.

FIGS. 1 and 2 principally depict in schematic form active pixels according to embodiments of the present invention, FIG. 1 illustrating the most simple embodiment, and FIG. 2 illustrating a more elaborate embodiment. The term "active pixel" refers to any pixel that has an active element integrated in the pixel, that is, at least one amplifier that typically comprises one or more transistors to amplify the charge that is collected on the light sensitive element in the pixel. Active pixels may also be equipped with additional electronics for more elaborate functions, such as filtering, high speed operation, or operation in more extreme illumination conditions. The active pixels may be made by MOS or CMOS processing or by methods compatible with MOS or CMOS processing.

The input signal to an active pixel is the radiation intensity at the location of that pixel. The radiation may be any of optical light, IR light, UV light, high energy particles, X-rays, etc. although optical light, IR light, UV light are preferred. In the following the embodiment of the present invention will be described with reference to incident light. The incident light intensity is transduced by a phototransducer such as a photodiode D (the sensor) and its associated circuits to an analog voltage at the output O of the pixel. The sensing is done via a sensor circuit 1, comprising, for example, a reverse-biased photodiode D and a reset switch $S_r$, for example formed by a reset transistor. The photodiode D is reset periodically to a fixed bias by means of the reset switch $S_r$, which is coupled between the reverse-biased photodiode D and a (positive) power supply Vpix. Closing the reset switch $S_r$ by applying a reset signal reset to the switch, for example by applying a reset signal to a gate of a reset transistor, at the beginning of every integration period pre-charges the junction capacitance $C_{ph}$ of the photodiode D. The photodiode D collects photo-generated charges, e.g. electrons (a semiconductor silicon substrate exposed to photons results in a release of charge carriers) and discharges in proportion to the integration period and the photocurrent of the photodiode D. The current that the photons of the light generate in the photodiode D is directly related to the incident light. For a linear device the current generated is preferably proportional to the light intensity.

The connection between the reset switch $S_r$ and the photodiode D is the photodiode node P. The voltage level over the photodiode D, i.e. the voltage level at photodiode node P, is shown by graph 30 in part (a) of FIG. 3.

In the simple embodiment of FIG. 1, the photodiode node P is coupled over a sample circuit 2, for example sample switch Ss, to a first terminal of a sample and hold circuit 3, comprising a parallel connection of at least three sample and hold stages 3a, 3b, 3c. Each sample and hold stage comprises a series connection of a memory element, e.g. a capacitor C1, C2, C3, and a sample switch S1, S2, S3, e.g. a transistor element, and each sample and hold stage 3a, 3b, 3c has a first and a second free node. The first free nodes of the sample and hold stages 3a, 3b, 3c are all connected together, and are connected to the photodiode node P. The second nodes of the sample stages 3a, 3b, 3c are also connected together and to a voltage Vmem. This voltage Vmem can be a DC voltage, such as ground for example, or a time-dependent voltage such as for example an AC voltage or a pulsed voltage.

A signal integrated in the photodiode D can be sampled by the sample circuit 2, for example by closing sample switch $S_s$, and can be stored in one of the sample and hold stages 3a, 3b, 3c on the corresponding memory element C1, C2, C3, e.g. C1, by closing the corresponding switch S1, S2, S3, e.g. S1.

The signal present on the memory element C1, C2, C3 of a sample and hold stage 3a, 3b, 3c can be consequently sensed by a buffer 6, for example comprising a buffer transistor, by again closing the corresponding switch S1, S2, S3. This signal can then be read out in a conventional line-addressing/column readout fashion by closing a row selection switch $S_{rs}$, for example implemented by means of a transistor. Many implementation schemes are possible for the combination of the buffer 6 and the row selection switch $S_{rs}$, and are known to a person skilled in the art.

In operation, pixels integrate radiation impinging onto them, and transduce it into an analog voltage signal. As a start, the photodiode D is reset, by temporarily closing the reset switch $S_r$. Before the beginning of a first integration period, the reset level of the pixel is sampled, for example on memory element C1, by closing sample switches $S_s$ and S1. After the reset operation, the reset switch $S_r$ is opened again, as well as the sample switches $S_s$ and S1, and the pixel begins to integrate impinging radiation. In order to perform correlated double sampling, at the end of the first integration period, the actual signal level of the pixel is sampled, for example on memory element C2, by closing sample switches $S_s$ and S2. Integration on the pixel during the first integration period is followed by a further reset of the photodiode D, by closing the reset switch $S_r$. The voltage level at photodiode node P again rises to the power supply level Vpix. During this reset or shortly thereafter, the signals stored on the memory elements C1 and C2 are presented to a correlated double sampler, for example a difference amplifier (not represented in the drawing), where the actual signal level without noise is calculated by subtracting the sample of the reset voltage from the second sampled signal. The sample of the reset voltage, i.e. the signal stored on memory element C1, contains the kT/C noise, which is eliminated by the subtraction of the difference amplifier. The double sampling technique also reduces the white noise. The white noise is part of the reset voltage (Vpix) as well as of the signal amplitude. With the assumption that the noise of the second sample was unchanged from the instant of the first sample (Vpix), the noise amplitudes are the same and are correlated in time. Therefore, the noise can be reduced by the correlated double sample function.

Before starting integration during the second integration period, the reset level of the pixels is sampled again, on memory element C3, by closing sample switches $S_s$ and S3. This means that, during the second integration period, the sampled values from the first integration period are still present, more particularly as the signals stored on the memory elements C1 and C2. Therefore, the reset time necessary for resetting the photodiode D can be taken as short as possible, long enough to completely reset the photodiode D, i.e. to bring the voltage level of photodiode P to a voltage which equals Vpix minus a voltage drop over the reset switch $S_r$. This is contrary to prior art implementations, where the reset time needs to last long enough to enable the pixel to present the sampled reset signal and the sampled actual pixel signal to the correlated double sampler. The embodiment of the present invention allows for higher speed operation of pixels.

In the more elaborate embodiment of FIG. 2, a buffer circuit 7, for example a transistor, is connected to the photodiode node P, where a voltage signal corresponding to the collected charge on the photodiode D is generated. The buffer circuit 7 is connected to an input of a sample circuit 2, for example a sample switch $S_s$, which may e.g. be a transistor. At an output node of the buffer circuit 7 appears a voltage that is a measure for the charge on the photodiode node P. At the beginning and the end of a desired integration period, the signal at the output node of the buffer circuit 7 is sampled by the sample circuit 2, and transferred to the sample and hold circuit 3, comprising at least three sample and hold stages 3a, 3b, 3c as represented in FIG. 1, connected with a first terminal to the sample circuit 2. Sample circuit 2 and memory circuit 3 together act as a sample and hold stage for the signal at the output node of the buffer circuit 7. Closing the sample switch $S_s$ and the switch S1 of the first sample and hold stage freezes the signal voltage on the memory element C1. The voltage on the memory element C1 depends on the transfer function of the sample circuit 2. The sample circuit 2 can for example either be a voltage follower buffer or a switch that transfers some of the charge stored in the photodiode depletion capacitance into the memory element C1. A voltage follower plus switch is a possible particular implementation of a sample circuit 2, but the invention is not limited thereto, and many other implementations exist.

In case of a sample circuit 2 comprising a switch, the memory element C1 should be pre-charged to a starting voltage before the sampling occurs. Pre-charge circuit 5, e.g. comprising a switch $S_p$, for example a transistor, serves to pre-charge the voltage on the capacitor C1 to a low level upon application of a pre-charge pulse precharge to the switch $S_p$. The voltage frozen on the memory element C1 can be consequently sensed by a buffer 6, and read out in a conventional line-addressing/column readout fashion by the row select switch $S_{rs}$.

All control signals necessary to implement the above embodiments may be generated by a dedicated timing circuit.

Figure 3:
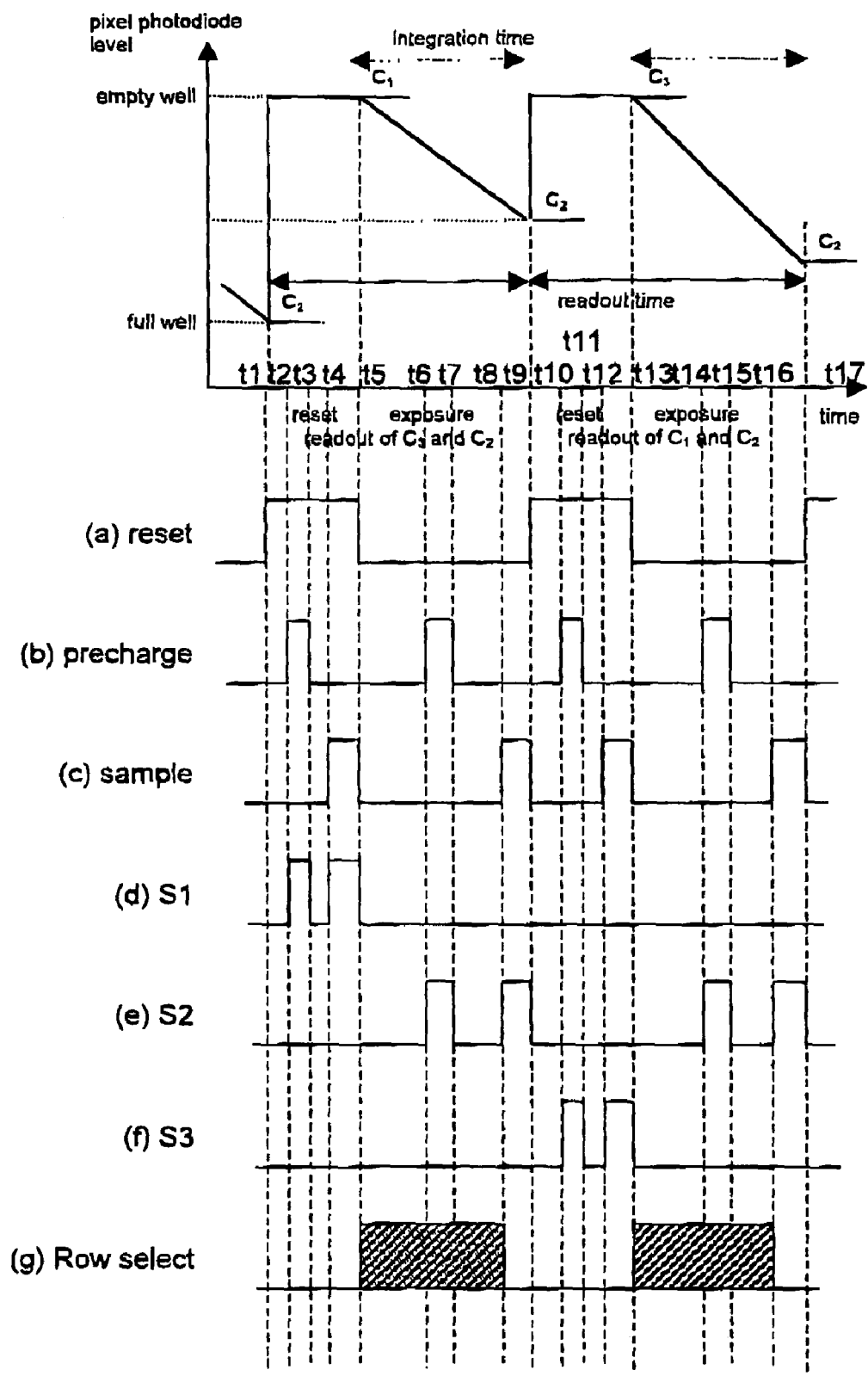
FIG. 3 is a time chart showing timing of different signals in a pixel as represented in FIG. 2 and the voltage level at the photodiode node.

In the pixel of FIG. 2, several signals, which are external to the pixel, are applied to switches, e.g. to gates of transistors. A timing chart thereof is shown in FIG. 3. From a time t1 to a time t5, a reset signal reset, applied to the switch $S_r$, discharges the photodiode node P, before starting a new integration period. A pre-charge signal precharge, applied to the pre-charge switch $S_p$ from a time t2 to a time t3, pre-charges the memory capacitor C1 to a low level. In order to obtain this, at the same time as applying the pre-charge signal precharge to the pre-charge switch $S_p$, a switching signal is applied to the switch S1 of the sample and hold stage 3a. A pre-charge pulse should occur before a sample switch pulse occurs at the sample switch $S_s$ of the sample circuit 2. The sample switch pulse from a time t4 to a time t5, together with a closing pulse to the switch S1 charges the memory capacitor C1 to the signal level present at the output node of the buffer 7 at the end of the reset time. Opening the sample switches Ss and S1 stores the signal level (pixel reset level) at the end of the reset period. During the integration period, from a time t6 to a time t7, a new pre-charge pulse precharge is applied to the pre-charge switch $S_p$, and at the same time a closing pulse is applied to the switch S2 of the sample and hold stage 3b. Thereafter, a sample switch pulse occurs at the sample switch $S_s$ of the sample circuit 2. The sample switch pulse from a time t8 to a time t9, together with a closing pulse to the switch S2 charges the memory capacitor C2 to the signal level present at the output node of the buffer 7 at the end of the integration period. Opening the sample switches Ss and S2 stores the actual signal level at the end of the integration period onto memory capacitor C2. As from the end of the first integration period up to the end of the second integration period, the signals sampled on the first memory capacitor C1 and second memory capacitor C2 can be used by a correlated double sampler to extract the actual signal value without noise. Hereto, in order to read out the stored signals, the row select switch $S_{rs}$ is closed at appropriate moments in time, as well as the appropriate switches S1, S2 (this switching for readout not being indicated in FIG. 3). A row-selection signal row select applied at the row selection switch $S_{rs}$ selects a particular row or line of pixels for readout. The row-selection signal can be applied at any moment during an integration period between two sample pulses. This is illustrated by the hatched zones, which show where a pulse can be.

After the first integration period, a new reset signal is applied to the reset switch Sr, from a time t9 to a time t13. During this reset period, from a time t10 to a time t11, memory capacitor C3 is pre-charged to a low level by applying a pre-charge pulse to the pre-charge switch $S_p$ and by applying at the same time a closing pulse to the switch S3. A sample switch pulse from a time t12 to a time t13, together with a closing pulse to the switch S3 charges the memory capacitor C3 to the signal level present at the output node of the buffer 7 at the end of the reset time. Opening the sample switches $S_s$ and S3 stores the signal level (pixel reset level) at the end of the reset period and starts the integration period. During the integration period, from a time t14 to a time t15, a new pre-charge pulse precharge is applied to the pre-charge switch $S_p$, and at the same time a closing pulse is applied to the switch S2 of the sample and hold stage 3b. Thereafter, a sample switch pulse occurs at the sample switch $S_s$ of the sample circuit 2. The sample switch pulse from a time t16 to a time t17, together with a closing pulse to the switch S2 charges the memory capacitor C2 to the signal level present at the output node of the buffer 7 at the end of the integration period. Opening the sample switches Ss and S2 stores the actual signal level at the end of the integration period onto memory capacitor C2. As from the end of the second integration period up to the end of a third integration period, the signals sampled on the memory capacitor C2 and on the memory capacitor C3 can be used by a correlated double sampler to extract the actual signal value without noise. Hereto, in order to read out the stored signals, the row select switch $S_{rs}$ is closed at appropriate moments in time, as well as the appropriate switches S3, S3 (this switching for readout not being indicated in FIG. 3). A row-selection signal row select applied at the row selection switch $S_{rs}$ selects a particular row or line of pixels for readout. The row-selection signal can be applied at any moment during an integration period between two sample pulses. This is illustrated by the hatched zones, which show where a pulse can be.

The pulses reset, sample and precharge may be specific for each pixel individually, or common for rows of pixels. A special case is where these three signals are common for all pixels in an image sensor. As the effective integration time of a pixel is the time between the opening of the reset switch $S_r$ and the opening of the sample switch $S_s$, the time when the pixels "see" can be fixed independently of the moment of readout of the pixels, which is determined by the line-selection signal applied to the row select switch $S_{rs}$.

The column output line of the pixel may end in a current load or a resistive load and will forward the pixel signal to a columns amplifier or another type of amplifier (whereby the type is not relevant for the present invention).

It is to be understood that although preferred embodiments, specific constructions and configurations, as well as materials, have been discussed herein for devices according to the present invention, various changes or modifications in form and detail may be made without departing from the scope and spirit of this invention. For example, the pixel circuits according to embodiments of the present invention have been described with respect to three memory elements being provided. Of course it might be considered to implement more than three memory elements for storing signal levels, for example providing four memory elements, two for storing the reset level and pixel value signal level of a first integration period, and two for storing the reset level and pixel value signal level of a second, subsequent integration period. However, using less capacitors means that less space is needed on a substrate, and thus allows for miniaturisation of the pixels and of array comprising such pixels.

The invention claimed is:
1. An active pixel comprising:
   a first sensor circuit configured to collect radiation induced charges and to transduce the radiation induced charges to a measurement signal corresponding to an amount of charge collected during an integration period of the first sensor circuit;
   a first memory element configured to store a first measurement signal at a beginning of a first integration period of the first sensor circuit;
   a second memory element configured to store a second measurement signal at an end of the first integration period of the first sensor circuit; and
   a third memory element configured to store a third measurement signal at a beginning of a second integration period of the first sensor circuit, wherein the second integration period is an integration period of the first sensor circuit immediately subsequent to the first integration period.

2. An active pixel according to claim 1, wherein the memory elements are capacitors.

3. An active pixel according to claim 1, wherein the memory elements are parts of sample and hold stages.

4. An active pixel according to claim 1, the memory elements having a first node, the active pixel furthermore comprising a pre-charge circuit to pre-charge the voltage on the first node of the memory elements.

5. An active pixel according to claim 1, furthermore comprising a readout circuit connected to the memory elements, for reading out the measurement signal present on the node of a memory element.

6. An active pixel according to claim 5, wherein a first buffer is provided between the memory elements and the readout circuit.

7. An active pixel according to claim 1, wherein a second buffer is provided between the sensor circuit and the memory elements.

8. An active pixel according to claim 1, wherein the sensor circuit comprises a series connection of a reverse-biased photodiode and a reset switch.

9. A method for performing correlated double sampling in an active pixel, comprising:
   during at least a first and a second subsequent integration period of the active pixel, collecting radiation induced charges and transducing the radiation induced charges to a measurement signal;
   storing, in a first memory element, a reset level of the pixel at a beginning of the first integration period of the active pixel;
   storing, in a second memory element, a measurement signal of the pixel at an end of the first integration period of the active pixel; and
   while performing the correlated double sampling with the stored reset level and the stored measurement signal, storing, in a third memory element, a reset level of the pixel at a beginning of the second integration period of the active pixel, wherein the second integration period is an integration period of the active pixel immediately subsequent to the first integration period.

10. A method according to claim 9, furthermore comprising a step of pre-charging a memory element before storing a signal.

11. A method according to claim 9, the active pixel comprising a photodiode, the method furthermore comprising a step of resetting the photodiode to a preset voltage level before the beginning of an integration period.

12. An array of active pixels, each active pixel comprising:
   a first sensor circuit configured to collect radiation induced charges and to transducer the radiation induced charges to a measurement signal corresponding to an amount of charge collected during an integration period of the first sensor circuit;

a first memory element configured to store a first measurement signal at a beginning of a first integration period of the first sensor circuit;

a second memory element configured to store a second measurement signal at an end of the first integration period of the first sensor circuit; and a third memory element configured to store a third measurement signal at a beginning of a second integration period of the first sensor circuit, wherein the second integration period is an integration period of the first sensor circuit immediately subsequent to the first integration period.

13. An array of active pixels according to claim 12, wherein the memory elements are capacitors.

14. An array of active pixels according to claim 12, wherein the memory elements are parts of sample and hold stages.

15. An array of active pixels according to claim 12, the memory elements having a first node, wherein each active pixel furthermore comprises a pre-charge circuit to pre-charge the voltage on the first node of the memory elements.

16. An array of active pixels according to claim 12, further comprising a readout circuit connected to the memory elements, for reading out the signals stored on the memory elements.

17. An array of active pixels according to claim 16, wherein in each pixel a first buffer is provided between the memory elements and the readout circuit.

18. An array of active pixels according to claim 12, wherein in each pixel a second buffer is provided between the sensor circuit and the memory elements.

19. An array of active pixels according to claim 12, wherein the sensor circuit of each pixel comprises a series connection of a reverse biased photodiode and a reset switch.

20. An array of active pixels according to claim 12, further comprising a circuit for controlling the timing of pre-charging of all the active pixels of the array at the same time.

\* \* \* \* \*